(12) United States Patent
Fischer

(10) Patent No.: US 6,406,104 B1
(45) Date of Patent: Jun. 18, 2002

(54) ABS AND/OR ASC CONTROL SYSTEM FOR MOTOR VEHICLES

(75) Inventor: Gerhard Fischer, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 688 days.

(21) Appl. No.: 08/736,330

(22) Filed: Oct. 23, 1996

(30) Foreign Application Priority Data

Oct. 23, 1995 (DE) .......................................... 195 39 345

(51) Int. Cl.⁷ ................................................ B60T 8/14
(52) U.S. Cl. ........................ 303/146; 303/147; 303/186
(58) Field of Search .............................. 303/146, 147, 303/186, 149, 177

(56) References Cited

U.S. PATENT DOCUMENTS

| | | | | |
|---|---|---|---|---|
| 4,657,314 A | * | 4/1987 | Leiber .......................... | 303/147 |
| 4,902,076 A | * | 2/1990 | Ushijma et al. ............. | 303/146 |
| 5,632,535 A | * | 5/1997 | Luckevich et al. .......... | 303/186 |
| 5,669,677 A | * | 9/1997 | Fischer ........................ | 303/147 |

FOREIGN PATENT DOCUMENTS

| | | |
|---|---|---|
| DE | 1902944 | 8/1970 |
| DE | 3624007 | 1/1988 |
| DE | 3731756 | 3/1989 |
| DE | 3903709 | 8/1989 |
| DE | 3817546 | 12/1989 |
| DE | 4010322 | 10/1990 |
| EP | 0 128 582 A2 | 12/1984 |

OTHER PUBLICATIONS

German Patent Search dated Feb. 12, 1996.
"ATZ Automobile" magazine article, 1995.

* cited by examiner

*Primary Examiner*—Matthew C. Graham
(74) *Attorney, Agent, or Firm*—Crowell & Moring LLP

(57) ABSTRACT

A braking control system for a motor vehicle has an analysis unit for generating a signal proportional to the lateral acceleration of the vehicle and actuators for reducing the brake pressure on at least one wheel during cornering and with a simultaneous brake operation. A symmetrical reduction of the brake pressure is carried out on both wheels of an axle when the amount of the signal proportional to the lateral acceleration is larger than a first lower threshold value.

8 Claims, 2 Drawing Sheets

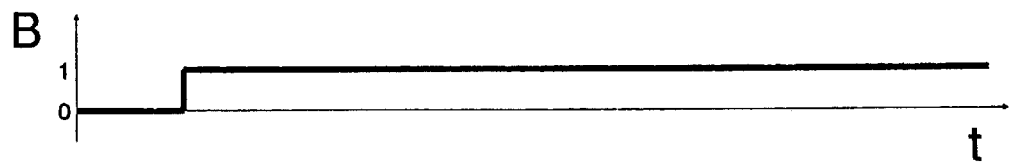
Fig. 1a
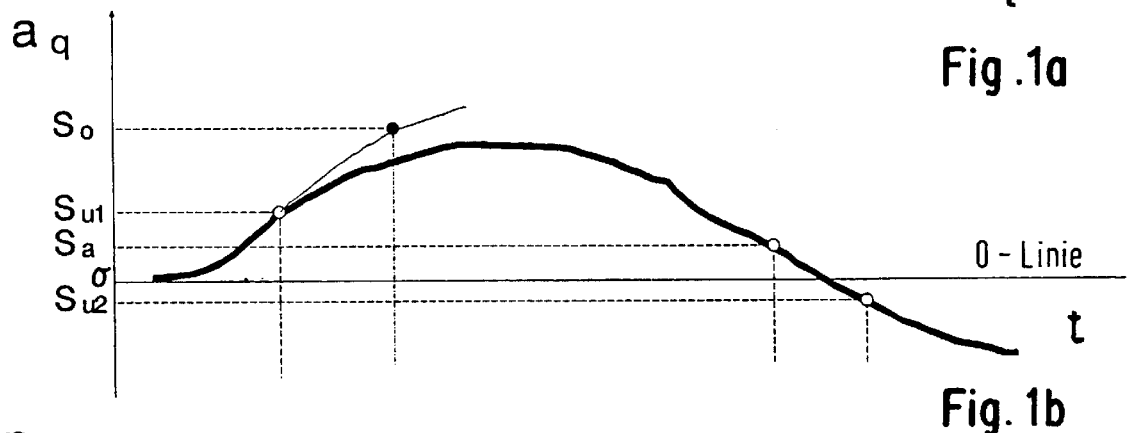
Fig. 1b
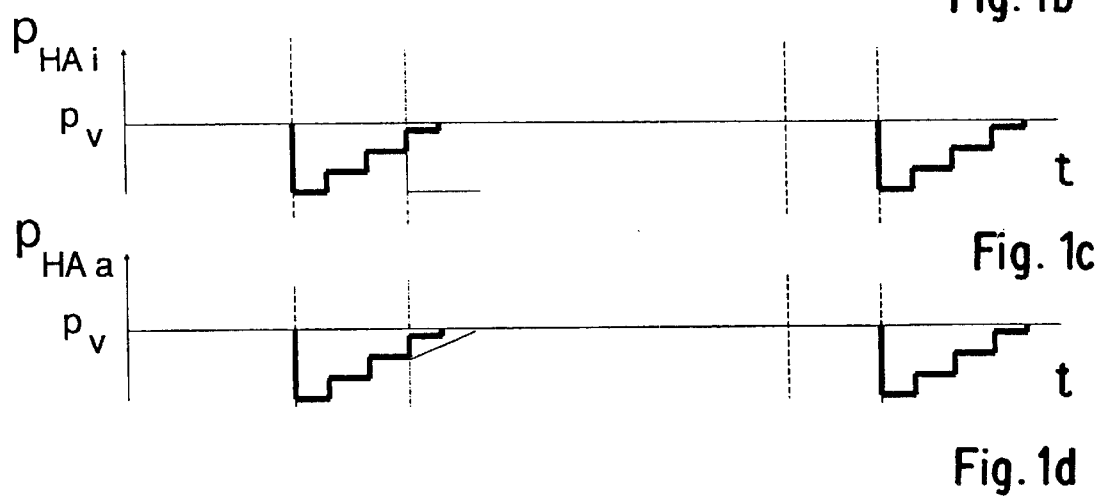
Fig. 1c
Fig. 1d

ABS AND/OR ASC CONTROL SYSTEM FOR MOTOR VEHICLES

BACKGROUND AND SUMMARY OF THE INVENTION

This invention relates to an automatic braking system (ABS) and/or automatic skid control (ASC) system for motor vehicles.

A control system for motor vehicles of the generic type is disclosed, for example, in the ATZ article "Brake System and Slip Control Systems of the New BMW 7-Series", January 1995, Pages 15, and on. This known control system has a sensor arrangement for sensing the four rotational wheel speeds of a motor vehicle. Based on the signals of this sensor arrangement, a locking tendency of the wheels during high braking maneuvers is recognized and is prevented by normal ABS control. In the case of the system known as "Special ABS", an additional wheel-selective control of the brake pressure is permitted in addition to the normal ABS control. When the driver triggers partial braking during cornering, a pulsed pressure buildup or a reduction of the brake pressure takes place on the inside rear wheel, or on the inside front and rear wheels, by means of the existing actuators of an ABS/ASC control system. "Partial braking" is a brake operation in which an ABS control is initiated at no more than one wheel of the powered axle or both wheels of the nonpowered axle.

In this known system, cornering is recognized when a specific lateral acceleration threshold is exceeded. For this purpose, the lateral acceleration is realistically determined from the driving speed and the signal of a steering angle sensor.

German Patent Document DE 195 10 104, which has not been published, discloses a system in which cornering is recognized by computing a first actual value proportional to the lateral acceleration of the rear axle, based on the difference of the rotational speeds of the rear wheels, and/or by computing a second actual value proportional to the lateral acceleration of the front axle, based on the difference of the rotational speeds of the front wheels. In this manner cornering can be recognized without need of additional sensor arrangements, such as steering angle sensors or lateral acceleration sensors, by making multifunctional use of existing rotational wheel speed sensors. As used herein, "cornering recognition" covers not only the extent but, for example, also the type of a curve (right-hand curve, left-hand curve).

In known control systems, a certain value of lateral acceleration (or of a quantity proportional to the lateral acceleration) is used as a criterion to determine only the existence or non-existence of cornering. When cornering is detected, or when the defined value is exceeded, only cornering-related roll-stabilizing measure is implemented, regardless of the extent of the curve. Therefore, in this case, only a roll stabilizing environmental parameter of the vehicle is taken into account. However, experiments have demonstrated that, particularly at a high vehicle speed, parameters caused by the vehicle construction, such as torsional movements, may also result in unstable conditions, even when the lateral acceleration is low.

It is an object of the present invention to provide an improved control system of the type mentioned above, which prevents unstable conditions that result from parameters caused by vehicle construction, and which affect vehicle operation, even when the lateral acceleration is low.

This object is achieved according to the invention, by carrying out a symmetrical reduction of the brake pressure on both wheels of an axle, preferably the powered axle, whenever a quantity proportional to lateral acceleration is greater than a first lower threshold value. Prerequisites for such a symmetrical reduction of brake pressure on both wheels of an axle are the presence of at least a slight curve, a simultaneous uninterrupted brake operation in the form of a partial braking—as defined above—, and optionally also a vehicle speed which is above a given threshold of, for example, approximately 110 km/h.

The symmetrical reduction of the brake pressure on both wheels of the powered axle, while the higher "pilot" brake pressure set by the driver is maintained on the wheels of the nonpowered axle, stabilizes the vehicle by generating forces similar to those which are generated by an active counter-steering of the wheels of the powered axle (in the experiment, of the rear axle).

The invention thus achieves an effective low-cost stabilization of the vehicle with respect to vehicle-internal parameters that generate instability.

In an advantageous embodiment of the invention, if the signal indicative of lateral acceleration changes signs (indicating a direct change of curve direction) while brake operation is maintained, a symmetrical reduction of the brake pressure is thereafter carried out on both wheels of an axle when the quantity proportional to the lateral acceleration is larger than a second lower threshold value, which is smaller than the first lower threshold value, but larger than zero. This embodiment is particularly effective in the case of a double curve, such as an immediate left/right cornering sequence. During immediately successive curve direction changes, the response behavior of the measure according to the invention for increasing stability with respect to the curve(s) following the first curve, becomes even more sensitive.

According to another advantageous embodiment of the invention, brake pressure is reduced asymmetrically. That is, the brake pressure on the wheel which is on the inside during cornering is reduced to a greater extent than the brake pressure on the wheel which is on the outside during such cornering, whenever the lateral acceleration exceeds a given upper threshold value which is greater than the lower threshold values.

In this case, it is assumed that for curves that are more pronounced than a certain threshold, the effects of the curve-related external parameters exceed the effects of the vehicle-construction-related internal parameters. Thus, the known curve-related stability increasing measures are modified.

It should be added that generally the reduction of the brake pressure is preferably implemented abruptly, but is eliminated gradually, as comfortably as possible.

These and other objects, features and advantages of the present invention will become more readily apparent from the following detailed description of the drawing wherein:

BRIEF DESCRIPTION OF THE DRAWINGS

FIG. 1 is a wave diagram which illustrates the operation of an embodiment of the invention;

DETAILED DESCRIPTION OF THE DRAWINGS

Figure 2:
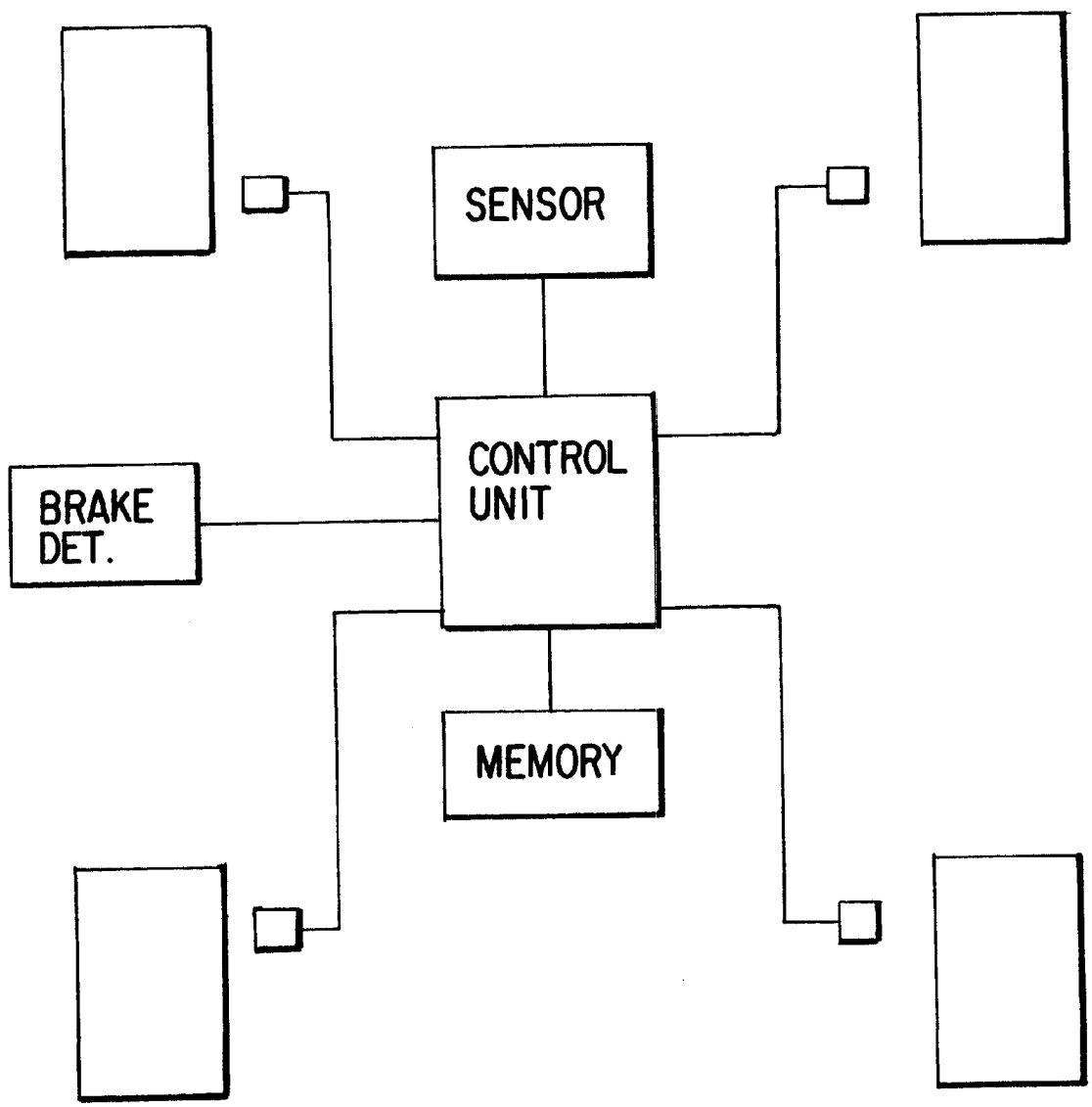
FIG. 2 is a schematic block diagram of an embodiment of the invention.

For a better understanding of the invention, the following definitions are used:

In the case of a motor vehicle that is driving, for example, along a left-hand curve, the left front and left rear wheels are considered to be on the inside during the cornering, while the right front and right rear wheels are considered to be on the outside during the cornering. Correspondingly, in the case of a right-hand curve, for example, the right wheels are considered to be on the inside during the cornering, and so forth.

Referring to FIG. 1, the uppermost waveform shows the switch-on (B=1) and switch-off (B=0) states of the vehicle brakes relative to time t, which can be detected, for example, by means of the brake signal B of a brake light switch existing on the brake pedal in an electronic control unit (not shown) assigned to the ABS/ASC control system.

An analysis unit contained in the control unit generates a lateral acceleration signal $a_q$ which is proportional to the lateral acceleration of the vehicle, based on the input signals to the control unit, in a conventional manner. This signal is then compared with the following threshold values stored in the analysis unit as shown in FIG. 1:

$S_{u1}$—a first lower threshold value;
$S_{u2}$—a second lower threshold value;
$S_O$—an upper threshold value; and
$S_a$—switch-off threshold value.

The third and fourth diagrams in FIG. 1 illustrate the courses $p_{HAi}$ and $p_{HAa}$ of the brake pressure on the respective inside and outside wheels of the rear axle (HA), which is the powered axle. The brake pressure on the wheels of the front axle (the nonpowered axle), which are not shown here, correspond to the pilot brake pressure $p_v$ set by the driver.

The course of the lateral acceleration signal $a_q$ over the time indicates a double curve. That is, a left-hand curve is assigned to the positive range of the lateral acceleration signal $a_q$, and a right-hand curve is assigned to the negative range. Thus, in the present example, a direct transition exists from a left-hand curve into a right-hand curve.

When the left-hand curve is entered, even before a threshold value is exceeded, brake operation is detected by the transition of switch-off condition B=0 to the switch-on condition B=1. A prerequisite for the reduction of the brake pressure according to the invention is, on the one hand, the switch-on condition B=1 of the brake operation as well as the existence of a partial braking. It should be noted that, when the driver carries out a full braking in contrast to a partial braking, (that is, when, for example, both wheels of the powered axle or more than three wheels are locking), conventional ABS-control is carried out. However, this is not the object of the invention.

When the lateral acceleration signal $a_q$ exceeds the first lower threshold value $S_{u1}$ in the first curve (in this case, the left-hand curve), the brake pressure $p_{HAi}$ on the inside wheel and the brake pressure $p_{HAa}$ on the outside wheel of the powered axle (rear axle HA) are reduced symmetrically (that is, to the same extent) and synchronously with respect to the pilot brake pressure $p_v$. This symmetrical brake pressure reduction is independent of whether there is a left-hand or a right-hand curve.

The course of the symmetrical brake pressure reduction can be controlled arbitrarily (for example, continuously) and with respect to the time or the event. In the illustrated example, a maximal reduction first takes place abruptly; and subsequently within a given time window (for example, 1 s), a time-controlled quasi-continuous step-shaped increase of the brake pressure $p_{HAi}$ and $p_{HAa}$ takes place back to the pilot brake pressure $p_v$.

If the lateral acceleration signal $a_q$ (FIG. 1) falls below the switch off threshold value $S_a$ during a reduction of the brake pressure $p_{HAi}$ and $p_{HAa}$ relative to the pilot brake pressure $p_v$, the reduction is abruptly reset to the pilot brake pressure $p_v$ (not shown).

When, without any interruption of the brake operation (B remains equal to 1), the sign of the lateral acceleration signal $a_q$ changes (that is, for example, the lateral acceleration signal $a_q$ crosses the zero line from the positive range into the negative range in the second diagram, and the left-hand curve thus changes directly into a right-hand curve), the threshold for the switching-on of the symmetrical brake pressure reduction as described above changes from $S_{u1}$ (the first lower threshold value) to $S_{u2}$ (the second lower threshold value), which is smaller than $S_{u1}$ but preferably larger than the switch-off threshold value $S_a$.

When, as illustrated by the thin line $a_q$ in FIG. 1, the lateral acceleration signal exceeds the upper threshold value $S_o$ (here in a left-hand curve), the brake pressure $p_{HAi}$ is reduced once again on the inside wheel of the powered axle (in this example, the left rear wheel) while the brake pressure $p_{HAa}$ on the outside wheel of the powered axle (here in the right rear wheel), is increased or set back again to the pilot pressure $p_V$ as rapidly as possible consistent with passenger comfort, as indicated by the thin lines $p_{HAi}$ and $p_{HAa}$ in FIG. 1. optionally, however, the symmetrical brake pressure reduction does not have to occur in the above-mentioned cases when the vehicle speed has not exceeded a defined upper speed threshold (for example, 110 km/h) This embodiment of the invention achieves optimal driving-condition-adapted stability, at a reasonable cost.

FIG. 2 is a schematic block diagram of an embodiment of the invention for performing the reduction of brake pressure as shown in FIG. 1. A central control unit 1 receives input signals from a brake pedal actuation detector unit 2 and from a sensor unit 3 which detects vehicle parameters indicative of lateral acceleration in a conventional manner. For example, the sensor unit 3 may comprise a plurality of wheel speed sensors, from the outputs of which a lateral acceleration can be determined in a manner well known to those skilled in the art. Numerous other techniques for detecting lateral acceleration are known and may be utilized for this purpose.

The control unit 1 receives input information from the sensor unit 3 and generates a lateral acceleration signal $A_q$. The latter signal is then compared with the threshold values $S_{u1}$, $SU_{u2}$, $S_o$ and $S_a$ which are predetermined and stored in the memory 4. Based on this comparison, and on the input signal received from the brake actuation detector 2, the control unit 1 controls a plurality actuators which operate to selectively reduce the brake pressure at the respective vehicle wheels 6 as illustrated in FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A braking control system for a motor vehicle having an analysis unit for generating a signal proportional to lateral acceleration of said vehicle and having actuators for reducing the brake pressure on at least one wheel when the vehicle brakes are operated during cornering of the vehicle, wherein:
   a symmetrical reduction of brake pressure is carried out on both wheels of an axle when the signal proportional to the lateral acceleration is larger than a first lower threshold value, and martial braking of the vehicle is implemented simultaneously therewith.

2. A braking control system for a motor vehicle having an analysis unit for generating a signal proportional to lateral acceleration of said vehicle and having actuators for reducing the brake pressure on at least one wheel when the vehicle brakes are operated during cornering of the vehicle, wherein:

a symmetrical reduction of brake pressure is carried out on both wheels of an axle when the signal Proportional to the lateral acceleration is larger than a first lower threshold value; and after a change of signs of the signal proportional to lateral acceleration during a time when vehicle brake operation is maintained, a symmetrical reduction of the brake pressure on both wheels of an axle is thereafter implemented when the signal proportional to lateral acceleration exceeds a second lower threshold value which is smaller than the first lower threshold value, but is larger than zero.

3. Control system according to claim 2 wherein brake pressure on an inside wheel during cornering is reduced by an amount which is greater than a corresponding reduction of brake pressure on an outside wheel during cornering, when the signal proportional to lateral acceleration exceeds a predetermined upper threshold value which amount is larger than the lower threshold values.

4. A braking control system for a motor vehicle having an analysis unit for generating a signal proportional to lateral acceleration of said vehicle and having actuators for reducing the brake pressure on at least one wheel when the vehicle brakes are operated during cornering of the vehicle, wherein:

a symmetrical reduction of brake pressure is carried out on both wheels of an axle when the signal Proportional to the lateral acceleration is larger than a first lower threshold value; and brake pressure on an inside wheel during cornering is reduced by an amount which is greater than a corresponding reduction of brake pressure on an outside wheel during cornering, when the signal proportional to lateral acceleration exceeds a predetermined upper threshold value which amount is larger than the lower threshold values.

5. A method of controlling brake operation of a motor vehicle, comprising the steps of:

detecting actuation of brakes of said vehicle;

detecting a lateral acceleration of said vehicle;

generating a lateral acceleration signal proportional to lateral acceleration of said vehicle;

comparing said lateral acceleration signal with a plurality of predetermined threshold values;

when a lateral acceleration is detected during an operation of said vehicle brakes in a partial braking mode, implementing a symmetrical reduction of brake pressure on both wheels of an axle of said vehicle when said lateral acceleration signal exceeds a first lower threshold value.

6. A method of controlling brake operation of a motor vehicle, comprising the steps of:

detecting actuation of brakes of said vehicle;

detecting a lateral acceleration of said vehicle;

generating a lateral acceleration signal proportional to lateral acceleration of said vehicle;

comparing said lateral acceleration signal with a plurality of predetermined threshold values;

when a lateral acceleration is detected during an operation of said vehicle brakes, implementing a symmetrical reduction of brake pressure on both wheels of an axle of said vehicle when said lateral acceleration signal exceeds a first lower threshold value;

detecting a change in sign of said lateral acceleration signal; and following a change in sign of said lateral acceleration signal, implementing a symmetrical reduction of brake pressure on both wheels of an axle of said vehicle when said lateral acceleration signal exceeds a second threshold value which is smaller than said first threshold value but greater than zero, while said vehicle brakes are actuated.

7. Method according to claim 6, comprising the further steps of:

reducing brake pressure on an inside wheel during cornering, by an amount which is greater than a corresponding reduction of brake pressure on an outside wheel during cornering, when the lateral acceleration signal exceeds a predetermined upper threshold value which is larger than the lower threshold values.

8. A method of controlling brake operation of a motor vehicle, comprising the steps of:

detecting actuation of brakes of said vehicle;

detecting a lateral acceleration of said vehicle;

generating a lateral acceleration signal proportional to lateral acceleration of said vehicle;

comparing said lateral acceleration signal with a plurality of predetermined threshold values;

when a lateral acceleration is detected during an operation of said vehicle brakes, implementing a symmetrical reduction of brake pressure on both wheels of an axle of said vehicle when said lateral acceleration signal exceeds a first lower threshold value; and reducing brake pressure on an inside wheel during cornering, by an amount which is greater than a corresponding reduction of brake pressure on an outside wheel during cornering, when the lateral acceleration signal exceeds a predetermined upper threshold value which is larger than the lower threshold values.

* * * * *